United States Patent
Scharfen et al.

[15] 3,698,729
[45] Oct. 17, 1972

[54] POWER OPERATED CLAMPING DEVICE FOR MACHINE TOOLS

[72] Inventors: Hans Scharfen, Buderich; Josef Steinberger, Dusseldorf, both of Germany

[73] Assignee: Paul Forkardt Kommanditgesellschaft, Dusseldorf, Germany

[22] Filed: Feb. 17, 1971

[21] Appl. No.: 116,158

[30] Foreign Application Priority Data

Feb. 19, 1970 Germany..........P 20 07 509.6

[52] U.S. Cl. ......................279/4, 279/114, 279/117
[51] Int. Cl..........................B23b 31/16, B23b 31/30
[58] Field of Search....................279/4, 117, 114, 110

[56] References Cited

UNITED STATES PATENTS

| | | | |
|---|---|---|---|
| 2,779,601 | 1/1957 | Skillin | 279/4 |
| 1,594,716 | 8/1926 | Forkardt | 279/114 |
| 1,452,034 | 4/1923 | Forkhardt | 279/117 |

*Primary Examiner*—Gil Weidenfeld
*Attorney*—Walter Becker

[57] ABSTRACT

A power operated clamping device for machine tools in which a chuck body having radially moveable jaws is mounted on one end of a spindle while an oscillatory fluid motor is mounted on the other end of the spindle. Actuating blocks on the chuck body are connected to the motor and engage the jaws and move the jaws positively when the motor is actuated. When the motor is turned beyond a certain limit, the blocks disengage from the jaws while simultaneously a control system is actuated to prevent rotation of the spindle.

6 Claims, 9 Drawing Figures

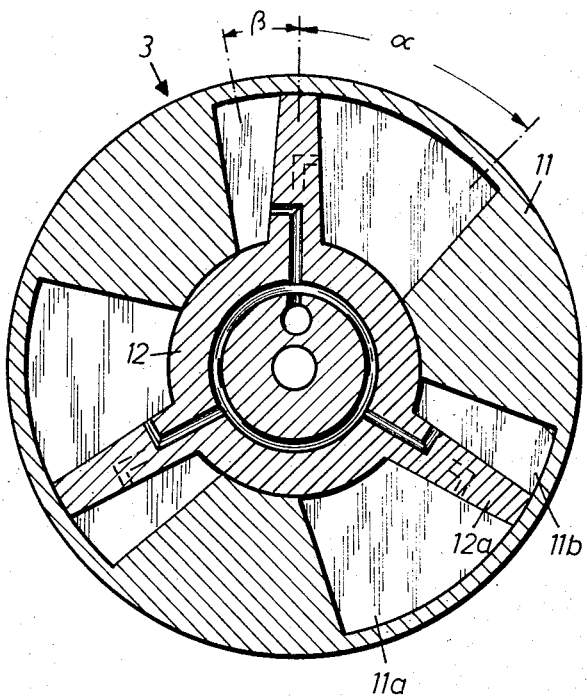
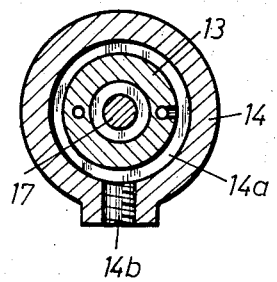
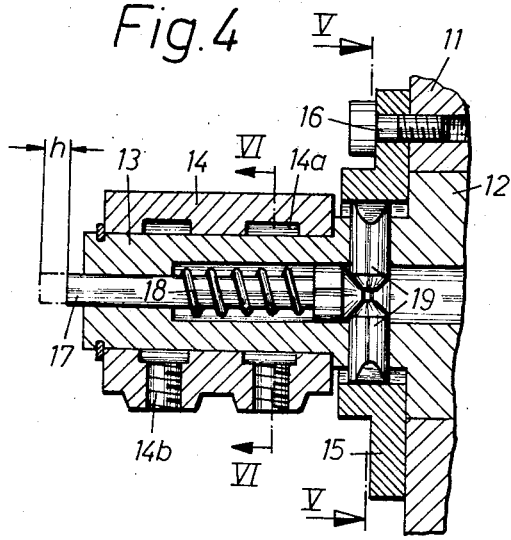
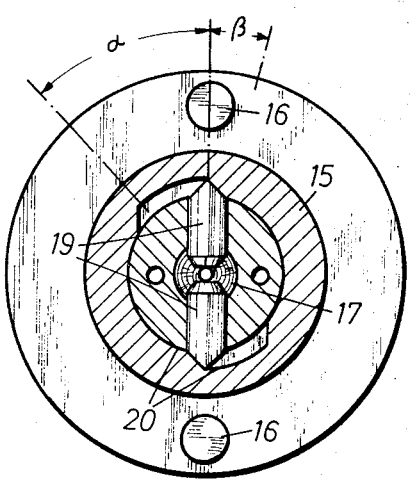

POWER OPERATED CLAMPING DEVICE FOR MACHINE TOOLS

The present invention relates to a power operated clamping device for machine tools with a chuck connected to the spindle and having exchangeable clamping shoes which are adapted to be driven by wedgeblocks guided in the chuck. More specifically, the present invention concerns a power operated clamping device of the above mentioned type with a rotatable pressure fluid operable cylinder piston system connected to the other end of the spindle, to which pressure fluid operable cylinder piston system the pressure fluid is conveyed through a stationary pressure fluid conveying housing which is mounted on a rotating pivot while the movement of the piston of the cylinder piston system is by means of a transmission member arranged in the hollow spindle conveyed to the driving member for the chuck. Power operable clamping devices of this type are known for machine tools. The chuck equipped with wedgeblocks for driving the clamping shoes excels by its precision which also remains maintained for an operating period of several years. Inasmuch as the teeth of the wedgeblocks meshing with the teeth of the clamping shoes can be displaced to such an extent that the clamping shoes disengage the wedgeblocks, with wedgeblock chucks of this type there exists the possibility in a simple manner to adjust the clamping shoes in their position relative to the wedgeblocks and to exchange entire shoe sets. With the heretofore known design of the clamping device, the wedgeblocks are guided parallelly with regard to the axis of rotation of the body of the chuck. As drive, a pressure fluid operable cylinder piston system connected to the other spindle end is employed the clamping piston of which is displaceable in axial direction and through the intervention of a bar arranged in the hollow spindle and through a driving member guided in the chuck body is connected to the wedgeblocks. This known device requires a certain minimum height of the chuck body and therefore can be employed only with large chucks.

It is an object of the present invention to provide a power operable clamping device of the above mentioned general type for machine tools which, while retaining the advantage of the wedgeblock chuck, will also be applicable for chucks of small dimensions and which will have a control device which will make it possible as a safety measure to turn off the machine tool when the clamping shoes disengage the wedgeblocks.

This object and other objects and advantages of the invention will appear more clearly from the following specification in connection with the accompanying drawings in which:

FIG. 3 is a cross section through the pressure fluid operable cylinder piston system of FIG. 1, said section being taken along the line III—III of FIG. 1.

FIG. 4 represents on a larger scale than that of FIG. 1 a longitudinal section through the pivot of the pressure fluid operable cylinder piston system, said pivot receiving the control device and carrying the housing for the transfer of the pressure fluid.

FIG. 5 is a cross section through a portion of the control device, said cross section being taken along the line V—V of FIGS. 1 and 4.

FIG. 6 represents a cross section through a part of the control device, said cross section being taken along the line VI—VI of FIG. 4.

Figure 1:
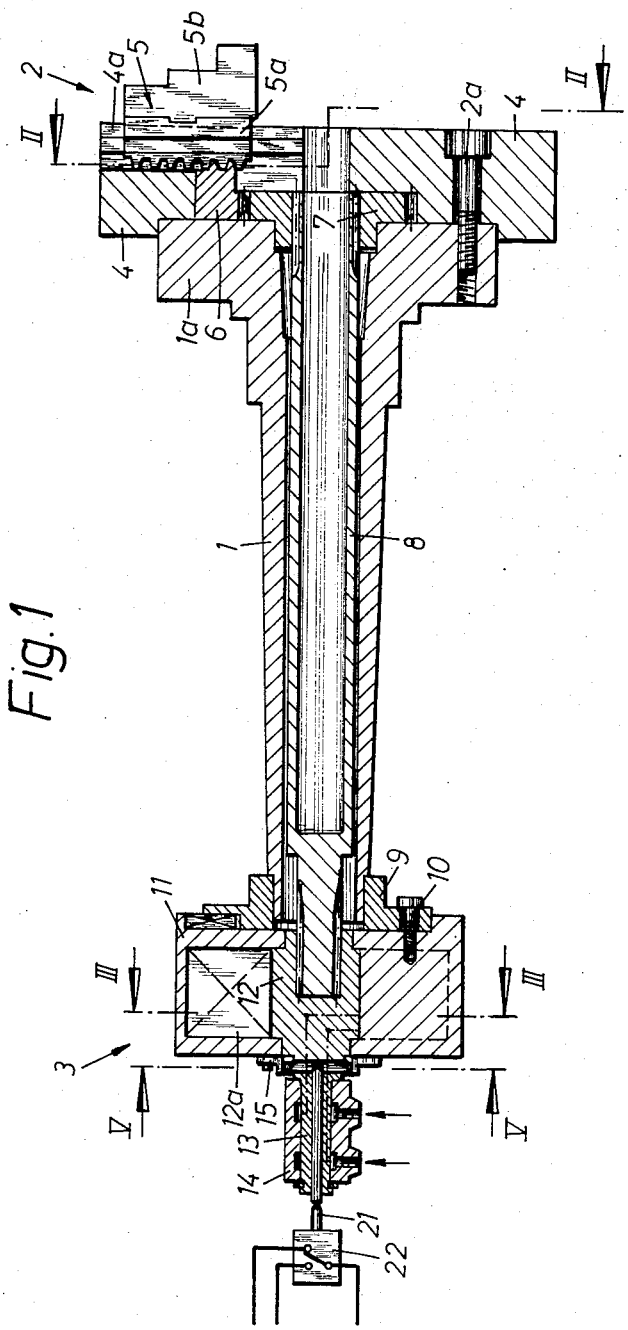
FIG. 1 represents a longitudinal section through the spindle of a machine tool with a clamping device according to the present invention.
Figure 2:
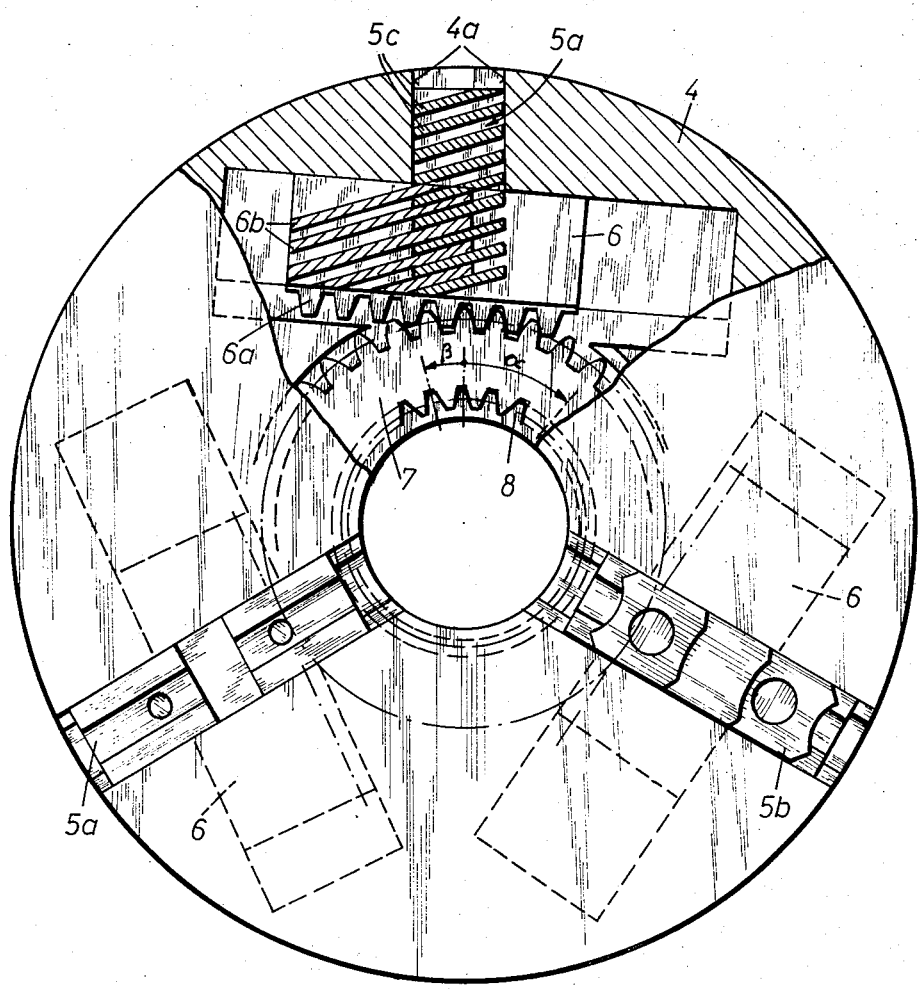
FIG. 2 is a partially sectioned front view of the chuck, said section being taken along the line II—II of FIG. 1.
Figure 7:
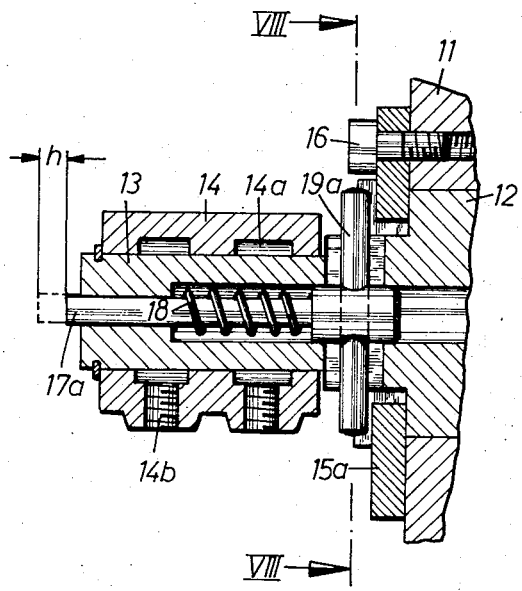
FIG. 7 illustrates a longitudinal section through a second embodiment of the pivot which receives the control device and carries the housing for the transfer of the pressure fluid.
Figure 8:
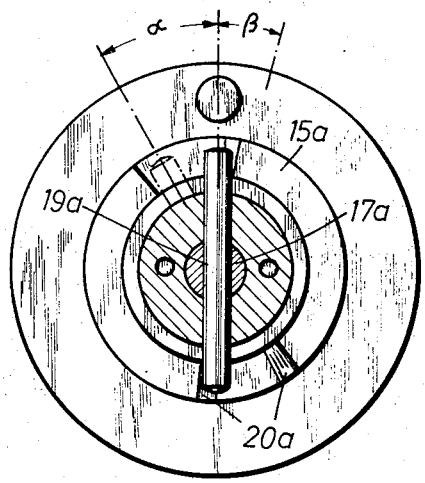
FIG. 8 is a section taken along the line VIII—VIII of FIG. 7.

The power operable clamping device according to the present invention is characterized primarily in that in the chuck body there is journalled a driving gear which meshes with driving teeth of wedgeblocks which are guided in a manner known per se tangentially with regard to the axis of rotation, the driving gear being operatively connected through a rotary pipe extending through the spindle directly to the vane of a reciprocating torque actuator. The arrangement according to the invention is furthermore characterized in that the pivot carrying the pressure fluid conveying housing is connected to the vane and is provided with a control device which is dependent on the angular position of the vane and thereby on the wedgeblocks.

In view of the tangential position of the wedgeblocks in the chuck body there is obtained the possibility of producing chucks with small dimensions which through the intervention of a pressure fluid operable cylinder piston system may in a simple manner be driven hydraulically or pneumatically by the employment of a pressure fluid operable cylinder with a reciprocating piston adapted to carry out an angular movement. In view of the transmission-free connection of the driving gear driving the wedgeblocks, through the intervention of a rotary pipe with the reciprocating pistons of the reciprocating torque actuator it is additionally possible to ascertain the relative position of the vane or reciprocating piston with regard to the cylinder housing in order to ascertain the respective position of the wedgeblocks. To this end, the pivot carrying the pressure fluid conveying housing is connected to the vane and is equipped with a control device.

According to a further feature of the invention, this control device is formed by a control pin which is axially displaceable in the pivot against the thrust of a spring. The control pin has one end protrude from the pivot while its other end is designed conically and is displaceable by preferably two actuating pins which are located opposite to each other and are radially guided in the pivot. These actuating pins have their inner conically designed end engage the control pin and are displaceable by means of a control cam in conformity with the angular position of the vane. The control cam is, according to the present invention, designed as a recess conforming to the pivot angle during the clamping operation. This recess is provided on a flange ring which is connected to the cylinder housing. In view of the displacement of the control device to the rear end of the spindle which carries the pressure fluid operable cylinder piston system, it has become possible for the first time to block the drive of the machine tool automatically until the wedgeblocks occupy a position in which they disengage the clamping shoes, the control device depending on the angular position of the vane and thereby on the wedgeblocks. Additionally the control device may in a simple manner be provided with an indicating device which indicates the respective position of the wedgeblocks not visible from the outside. Finally it is also possible with the aid of the control device to create a follow-up control for the movement of the wedgeblocks, for instance, in order after each adjustment or exchange of the clamping shoes and prior to each chucking operation to effect a full stroke of the chuck.

Instead of the above described control device, it is also possible in conformity with a further feature of the invention to form the control device by a control pin which is axially displaceable in the pivot against the thrust of a spring. The control pin has one end protrude from the pivot while its other end is provided in a transverse bore with an actuating pin having that end thereof which protrudes from the pivot cooperate with one axially extending control cam each of a flange ring connected to the cylinder housing. This design has the advantage that the axial movement of the control pin can be effected directly by an axial course of the cam so that the reversal of the control stroke from the radially arranged control cam to the axially movable control pin, as described in connection with the first embodiment of the control device, will not be needed.

If the clamping device according to the invention is to be used on hollow spindle which, for instance, permit the passing of tools therethrough, it is suggested according to the present invention to design the pivot as hollow pivot and to form the control device by preferably three control pins which are connected to an axially movably journalled control disc. The said control pins are each axially displaceable against the trust of a spring by means of a control cam of a flange ring which is connected to the cylinder housing, the control disc cooperating with a switch. In view of this design it is possible to provide the pivot with a bore of any desired large dimension. The control disc which for purposes of actuating a stroke-dependent switch replaces the control pins may, similar to the control pins of the two above mentioned designs, act upon switches of different designs as, for instance, mechanical or contact-free switches, in which instance these last mentioned switches may be operable inductively, capacitively, optically or magnetically.

In order to obtain a particularly simple connection between the rotary pipe and the driving gear on one hand and the vane on the other hand, it is suggested according to the present invention non-rotatably to connect the rotary pipe with the driving gear and/or with the vane by axially telescoping corresponding teeth.

Referring now to the drawings in detail, the arrangement shown therein comprises a spindle 1 with a spindle flange 1a. Connected to the spindle 1 (which pertains to a machine tool not shown) by means of chuck screws 2a is a chuck 2 which is adapted to be operated by a reciprocating torque actuator 3 arranged at the other spindle end. Chuck 2 has a chuck body 4 with radial guides 4a in which respectively are guided clamping shoes 5 each of which comprises a base shoe 5a and a mounted shoe 5b. The base shoes 5a have their back surface provided with teeth 5c adapted to be engaged by the teeth 6b of a wedgeblock 6 each. The wedgeblocks 6 are guided for tangential movement in the chuck body 4. The wedgeblocks 6 have their longitudinal side which points to the chuck center provided with driving teeth 6a engaged by a driving gear 7 which is rotatably journalled in the chuck body 4.

A rotary pipe 8 meshes in a non-rotatable manner with the driving gear 7, pipe 8 being passed through the hollow spindle 1 and extending to the other spindle end. The cylinder housing 11 of the reciprocating torque actuator 3 is connected to the other spindle end and, more specifically, an intermediate flange 9 by means of connecting screws 10. In the spindle housing 11 there is located a vane 12 which is equipped with wings 12a and which is likewise non-rotatably connected to the rotary pipe 8.

The pressure fluid required for actuating the reciprocating torque actuator 3 rotating with the spindle 1 is conveyed to the actuator 3 through the intervention of stationary pressure fluid conveying housing 14. Housing 14 is mounted on a pivot 13 arranged on the vane 12. The inflowing and outflowing pressure fluid communicates through two connections 14b and through passages extending in the actuator 3 and the vane 12 with the cylinder chambers 11a, 11b respectively. The two connections 14b are arranged in the pressure fluid conveying housing 14 while the connections 14b lead into annular grooves 14a.

When pressure fluid is supplied to the cylinder chambers 11b, the vane 12 is turned out of its FIG. 3 position in clockwise direction while the maximum turning angle corresponds to the angle α shown in FIG. 3. In view of the direct and transmission-free connection of the vane 12 through pipe 8 with the driving gear 7, the turning angle of the driving gear 7 corresponds to the angular displacement of the vane 12 so that this displacement is simultaneously a measure for the displacement movement of the wedgeblocks 6. Within the range of the angle α there occurs the chucking movement of the chuck 2. As soon as in response to a pressure fluid supply to the cylinder chambers 11a the wings 12a move beyond the FIG. 3 position into the range of angle β (change-over range); the teeth 6b of the wedgeblocks 6 disengage the teeth 5c of the base shoes 5a. The shoes 5a can then be displaced at random, can be removed, can be inversely introduced or can be replaced by other shoes. In this position the drive for the spindle 1 is supposed to be automatically interrupted so that the shoes can not be thrown out accidentally.

To this end, a control pin 17 is journalled in a centric axial bore in actuator 13. One end of control pin 17 protrudes from the actuator 13 and is under the influence of the thrust of a spring 18. The inwardly located end of control pin 17 is conically designed. This end is engaged by likewise conically designed actuating pins 19. Pins 19 located opposite to each other along a common diameter are guided radially in the actuator 13. The actuating pins 19 are displaced in conformity with the angular position of the vane 12 by one control cam 20 each which control cam is formed on the cylinder housing 11. According to the illustrated embodiment, the control cams 20 are provided on the flange ring 15 which is connected by means of screws 16 to the cylinder housing 11. The control cam 20 for each actuating pin 19 consists of a recess which corresponds to the pivot angle in the working range α. The cam 20 furthermore comprises the inner cylindrical surface of the flange ring 15 and also inclined transition areas. As long as the vane 12 operates within the range of the angle α, no radial displacement of the actuating pins 19 occurs. When, however, the vane 12 moves into the change-over range β, the corresponding parts of the control cam 20 press the actuating pins 19 radially inwardly whereby these pins through their conical surfaces move the control pin 17 in axial direction out of the actuator 13 against the thrust of spring 18. By means of the control pin 17 protruding from the actuator 13, the pushrod 21 of a switch 22 may be actuated which brings about an actuation or stopping of the drive of the spindle 1 until the vane 12 is located in the change-over range β. Both ends of the actuating pin 19a cooperate with one axially extending control cam 20a which control cams are formed on a flange ring 15a connected to the cylinder housing 11. In view of the axial extension of the cam, this design of the control device furnishes a direct control movement of the control pin 17a in response to a rotation of the pin 13 connected to the vane 13 so that the reversal of the control movement necessary with the design of the control device of FIGS. 4 and 5 can be omitted.

Figure 9:
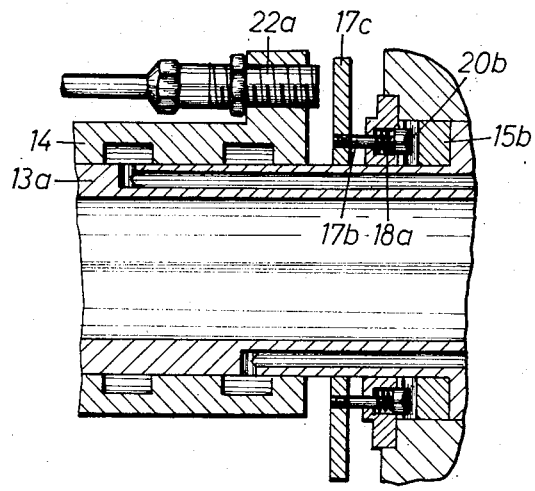
FIG. 9 represents a longitudinal section similar to that of FIG. 7 through a third embodiment of the pivot which forms a hollow pivot and receives the control device.

According to the third embodiment of the control device as shown in FIG. 9, the pivot 13 forms a hollow pivot 13a whereby it will be possible to pass tools to the chuck 2 through the rotary pipe 8 arranged in spindle 1. The control device of this design comprises three control pins 17b connected to an axially displaceably mounted control disc 17c. Each control pin 17b is against the thrust of a spring 18a axially displaceable by means of a control cam 20b whereby the three control cams 20b are each offset by 120° and are arranged on a flange ring 15b which latter is connected to the cylinder housing 11. When the vane 12 is turned and thus the hollow pin 13a is turned, an axial movement of the control disc 17c is effected in conformity with the design of the control cams 20, control disc 17c being scanned or felt by a switch 22a. Switch 22a shown in FIG. 9 represents a switch operating in a contact-free manner and responding to an axial movement of the control disc 17c, said switch may be a switch operable magnetically, inductively, capacitively or optically.

It is, of course, to be understood that the present invention is, by no means, limited to the particular constructions shown in the accompanying drawings but also comprises any modifications within the scope of the appended claims.

What is claimed is:

1. In a chucking device for a machine tool, a hollow spindle, a chuck body on one end of the spindle having jaw means guided for radial movement thereon, an actuating wedge block adjacent each jaw means and guided substantially tangentially on said body for movement in a direction at an angle to the direction of movement of the respective jaw means, inclined interengaging teeth on each jaw means and the respective actuating block operable to cause radial movement of said jaw means in response to reciprocal movement of said actuating wedge blocks, each actuating wedge block having rock teeth on the side facing the axis of said spindle, a drive gear co-axial with the spindle and meshing with said rock teeth, a rotating tube in the hollow spindle drivingly engaging said gear, an oscillating fluid motor carried by said spindle at the end opposite said chuck body and having a vane connected directly to said tube for reversible rotation thereof to move said jaw means radially on said chuck body, a pressure fluid conveying housing adjoining said fluid motor, a pivot portion carrying said pressure fluid conveying housing and connected to said vane, and means operatively connected with said motor for control thereof and adapted for actuation in response to movement of said vane beyond a predetermined rotational limit in at least one direction.

2. A chucking device according to claim 1, in which said control means comprise an axial control pin carried by and rotatable with said motor and spring urged in one direction, at least one radial pin element carried by said pivot portion, and cam track means engageable by said radial pin element when said motor moves beyond said predetermined rotational limit and operable to move said axial control pin against the spring bias thereon.

3. A chucking device according to claim 2, in which said cam track means is in the form of an arcuate recess having at least one inclined end.

4. A chucking device according to claim 1, in which there are pin means comprising inclined means at the end nearest said motor, cam actuator means comprising radial plunger means having an inner end engaging the inclined means on said pin means and rotatable with said motor, and stationary cam track means engaging the outer end of said plunger means operable for moving the plunger means radially inwardly when said motor moves beyond said predetermined rotational limit.

5. A chucking device according to claim 1, in which said control means includes three axially movable control pin means carried by said spindle and spring biased in one direction, cam actuator means operated by said motor and operatively engageable with said pin means when said motor moves beyond said predetermined rotational limit so as to move said pin means against the spring bias acting thereon, and switch means adapted for actuation in response to said movement of said pin means.

6. A chucking device according to claim 1, in which said drive gear has a splined central bore and said tube connected directly to said vane has a splined end axially telescopically engaging the splines in said bore.

* * * * *